358-86. XR 3,543,163 SR
SEARCH ROOM
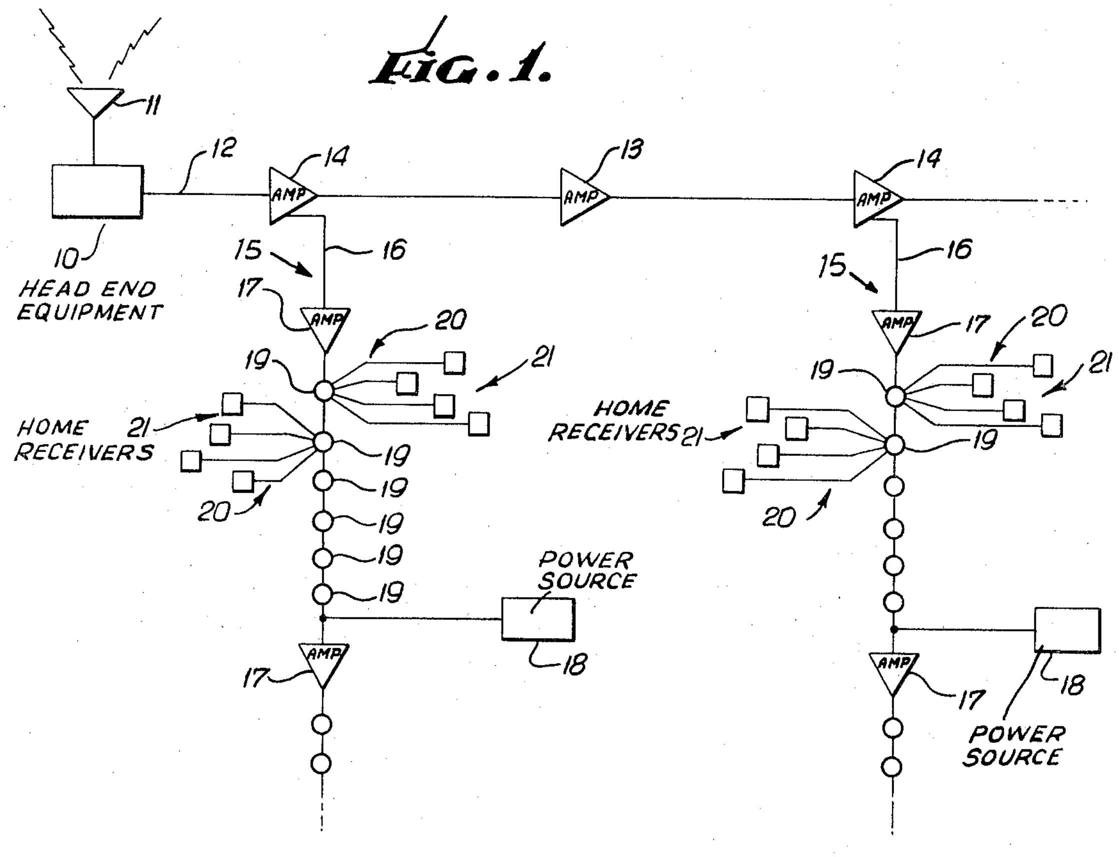
TX500
Rm
FIG. 2.
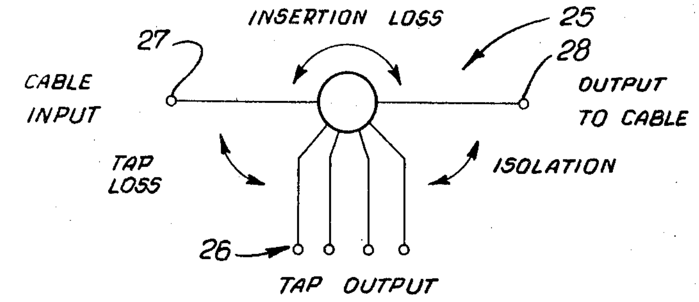
INVENTOR.
WILLIAM A. RHEINFELDER
By White & Haefliger
ATTORNEYS.

INVENTOR.
WILLIAM A. RHEINFELDER
BY White & Haefliger
ATTORNEYS.

CABLE TELEVISION SIGNAL LEVEL OPTIMIZATION

Filed June 8, 1966 3 Sheets-Sheet 3

INVENTOR.
WILLIAM A. RHEINFELDER
By White & Haefliger
ATTORNEYS.

3,543,163
CABLE TELEVISION SIGNAL LEVEL OPTIMIZATION

William A. Rheinfelder, South Laguna, Calif., assignor, by mesne assignments, to Anaconda Electronics Company, Anaheim, Calif., a corporation of Delaware Filed June 8, 1966, Ser. No. 556,043
Int. Cl. H04h 1/00
U.S. Cl. 325—308 8 Claims

ABSTRACT OF THE DISCLOSURE

A cable television distribution system involves setting output levels of main trunk and distribution amplifiers and spacing of such amplifiers in such relation as to optimize the system as respects reduction of distortion, noise and insertion loss, with provision for longer cascades of amplifiers.

This invention relates generally to cable television, and more specifically concerns reduction of distortion and losses in distribution and main trunk systems.

In cable television, that portion of the system relating directly to transmitting signals between the main trunk system and the subscribers' receiving equipment is called the distribution system. Such a system starts at a bridger-amplifier which is part of the main trunk system, and the distribution cable extending from that amplifier has a number of distribution amplifiers or line extenders connected in series with it. Between such amplifiers there are a number of taps, which may consist of pressure taps making contact with the center conductor of the cable by piercing the insulation, or they may consist of matching transformers, or directional taps or couplers, the latter also providing directivity (isolation from the output). Such taps introduce into the system an insertion loss, which varies inversely with tap loss. Decreased signal strength due to tap loss is undesirable in that it has to be compensated, in addition to cable loss (signal attenuation by the cable), by the distribution amplifiers. In addition, insertion loss is frequently "flat loss," that is equal loss at all television signal channels, which is difficult to compensate in the amplifiers and results in increased distortion.

It is an important object of the present invention to minimize or significantly reduce undesirable insertion loss, through the provision of an unusually high distribution level, that is, from 37 to 46 dbmv. db above 1 millivolt) at channel 13 (213 megacycles) at the output of each distribution amplifier. Such a system is quite critical in that too high a distribution level (i.e., over 46 dbmv.) will result in unacceptable distortion in the amplifier, whereas too low a level (less than 37 dbmv.) results in undesirably increased noise and an unacceptably large number of costly distribution amplifiers per a given number of subscribers. As will be seen, the invention concerns, at least in part, an optimized distribution system as respect reduced distortion and noise, spacing of taps, tap losses, proportioning of equalized loss to flat loss, and equipment specifications.

Another important aspect of the invention concerns relating the output levels of the main trunk amplifiers to the output levels of the distribution system amplifiers in such a way as to further the above-mentioned optimization. It has been discovered that this purpose is best served in the system under discussion when the outputs of the main trunk amplifiers at signal frequencies of about 213 megacycles are at lower dbmv. levels than the outputs of the distribution amplifiers at such frequency. Specifically, the main trunk amplifiers outputs at 213 megacycles should be within the range 30 to 40 dbmv. while the distribution system amplifier outputs at 213 megacycles should be within the range 37 to 46 dbmv. in the proposed system. Further, successive amplifiers in the main trunk, and also in the distribution systems should be spaced apart a cable distance corresponding to between 15 and 21 db attenuation. Unusually effective results include minimized insertion loss in the distribution system, maximum compensation for distortion in the distribution system, and provision for longer cascades of amplifiers, with acceptable quality signal distribution to more subscribers tapped on a distribution cable.

These and other objects and advantages of the invention, as well as the details of illustrative embodiments, will be more fully understood from the following detailed description of the drawings, in which:

FIG. 1 is a generalized block diagram showing a portion of a cable television system;

FIG. 2 is a diagrammatic representation of a distribution cable tap;

Figure 3:
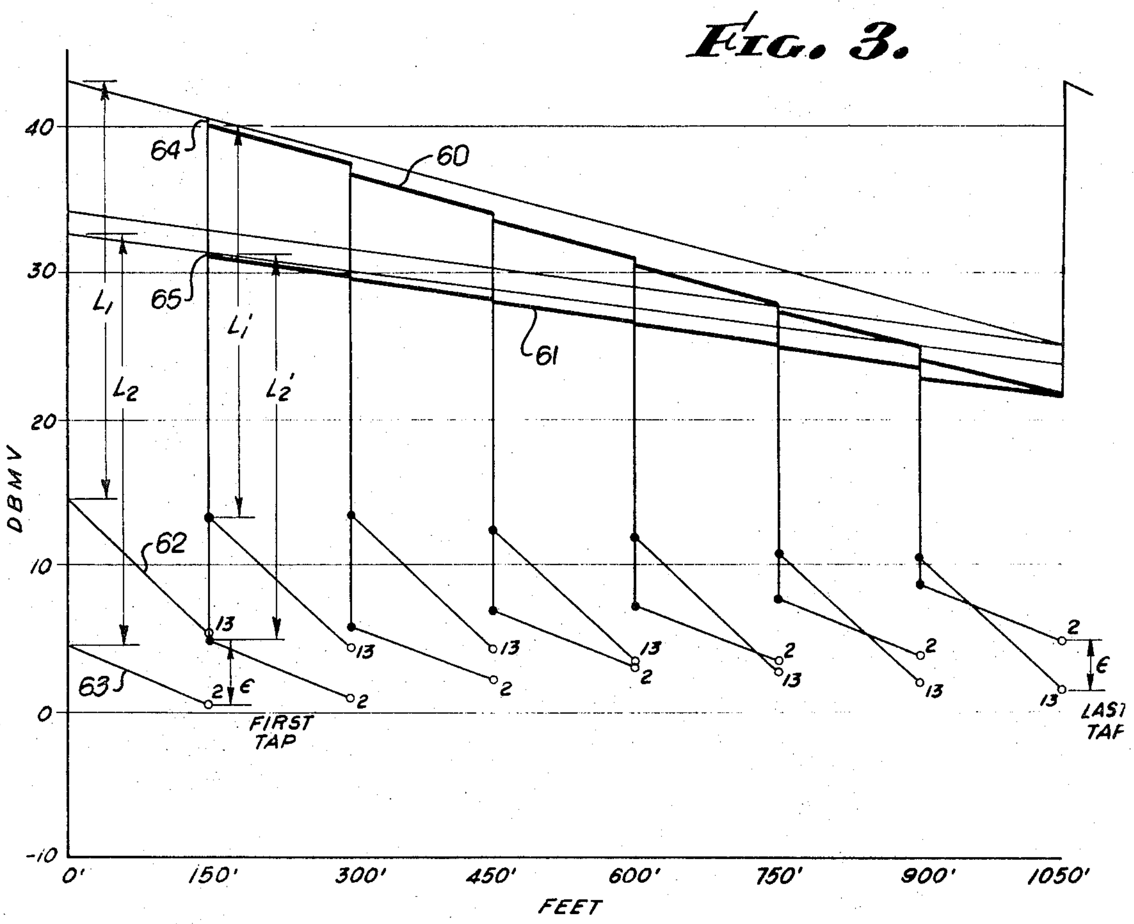
FIG. 3 is a distribution level diagram.

Referring first to FIG. 1, the illustrated cable television system includes head end quipment 10 with antenna 11 to pick up broadcast multichannel television signals. Such equipment is known and is operable to correct and adjust the signal level for each channel, with separate correction for picture and sound carriers. Such equipment also typically includes preamplifiers, demodulators, modulators for each channel, together with a multichannel combining network, the output of which is applied to the cable system.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers may also be connected in series with the cable to provide automatic correction for changes in signal level. The main trunk line also includes bridging amplifiers 14, each having several outputs and enough gain to make up for isolation loss and power loss inherent in multiple outputs. From the bridging amplifiers, feeder lines 15 are run along a row of subscribers' houses. The feeder lines include coaxial cable 16 and line extended amplifiers 17 operable to compensate for the loss in the feeder system. As an example, each feeder line may include four to ten or more line extended amplifiers. Power to the cables is supplied at permissible levels as by the transformers or other sources 18. Between successive amplifier 17 directional taps or couplers 19 are provided, typically with multiple outputs 20 to which individual home receivers 21 are connected, such taps being known devices. For example, a four house tap is typically used every 150 feet.

FIG. 2 illustrates a tapping device 25 which suppresses reflections, and in addition is matched in every direction. In this regard, reflections present in a cable due to mismatch (faulty termination) combine with the original signal to produce voltage peaks and dips by addition and subtraction. The ratio of the peak to dip voltage is termed vswr, and a perfect match with zero reflections produces a vswr of 1. For freedom from ghosting, most matches in a cable television system must have a vswr of 1.25 or less. In FIG. 2, tap loss is determined by position in the system, and various values can be constructed, ranging from 10 db to more than 30 db for a 4-way directional coupler. Insertion loss varies generally inversely with tap loss, in the sense that the greater the drop in gain at the tap outputs 26, relative to the signal level at the cable input 27, the less the drop in gain at the output 28 to the cable. FIG. 2 also shows the existence of "isolation" between tap and output terminals 26 and 28. "Isolation" refers to the ability of the tap to suppress reflections traveling to the left in FIG. 2 as inputs at point 28, whereby high isolation results in low reflection signal strength at tap output 26. A high quality tapping device providing isolation between tap and output terminals is termed a directional coupler, directivity being measured by the difference between tap loss and isolation. The greater this difference in db, the greater the directivity. Directional couplers with directivity of 15 db at channel 2 and 10 db at channel 13 are adequate for all cases. See in this regard, "CATV System Engineering," by William A. Rheinfelder, published January, 1966, by TAB Books, Thurmont, Md.

The amplifiers seen at 13, 14 and 17 may advantageously be of the solid state type described in my copending application entitled, "Cable Television Signal Distortion Reduction," such amplifiers affording relatively high signal output levels, especially in a cable powered system.

In accordance with one aspect of the invention, the outputs of the distribution amplifiers 17 are in the range 37 to 46 dbmv. at signal frequencies of about 213 megacycles (channel 13), and preferably between 40 and 43 dbmv. Also, successive distribution amplifiers are spaceed apart at cable distance corresponding to between 15 and 21 db attenuation. A recommended standard system is as follows:

TABLE I

| | | |
|---|---|---|
| Cable | 0.412" or equivalent | |
| Average loss at 213 mc (at 5° C) | 1.60 db per 100 ft. | |
| Average lot-width, feet | 50 | 75 |
| Spacing of 4-way directional taps, feet | 100 | 150 |
| Spacing of distribution amplifiers, feet | 1,000 | 1,050 |
| Output level, at 213 mc, dbmv | 43.0 | 43.0 |
| Output level, at 57 mc, dbmv | 32.5 | 32.5 |
| Input level, at 5° C., dbmv | 21.0 | 21.5 |
| System mode | (1) | (1) |
| Number of directional taps | 10 | 7 |
| Cable loss, db | 16 | 16.8 |
| Flat loss, db | 3.2 | 2.2 |
| Equalized loss, db | 3.6 | 2.4 |
| Hot loss (+60° C), db | 1.8 | 1.9 |
| Total gain, 213 mc, db | 24.6 | 23.3 |
| Number of houses per amplifier | 40 | 28 |
| Values of directional taps, nominal tap loss, db. | 27, 27, 24, 24, 21, 21, 18, 18, 15, 15 | 27, 27, 24, 21, 18, 18, 15 |
| Number of distribution amplifiers in cascade. | 6 | 6 |
| Total number of subscribers per bridger output. | 280 | 196 |

[1] Full tilt.

The spacing of the 4-way taps corresponds to about two lot widths, i.e., between 100 and 150 feet.

FIG. 3 shows an optimized distribution system level diagram, using 4-way directional taps with 150-foot tap spacing (column 2 in Table I). The ordinate scale gives signal level in dbmv. and the abscissa scale gives distance in feet. Starting at the level of 43 dbmv. for channel 13, the signal drops along a sloping line 60 until it hits the lowest point at about 1050 feet, where it is amplified and brought up to a level of 43 dbmv. The line 60 represents only attenuation of 0.412 inch aluminum cable. A similar line for channel 2 is seen at 61. At the 0-foot location the first tap which is at the distribution amplifier produces 28.5 dbmv. loss $L_1$ at channel 13 and 28.0 dbmv. loss $L_2$ for channel 2. The signal then goes through the house drop (slanted line 62 for channel 13 and line 63 for channel 2) and arrives at the TV set with a level of 5.5 dbmv. at channel 13 and 0.5 dbmv. at channel 2. While the effective length of the house drop cable running from the top to the subscriber equipment may vary, 150 feet is reasonable to select in view of aging of the usual lower quality house drop cable. Since all channel signal levels are encompassed by the channel 2 and 13 levels, and since all levels are well above −10 dbmv. (the minimum necessary at the TV set for flawless reception) reception should be perfect, i.e., free of excessive noise and distortion.

At the 150-foot location another tap produces 26.5 dbmv. loss $L_1'$ at channel 13 and 26 dbmv. tap loss $L_2'$ at channel 2. As the tap loss lessens, insertion loss is incurred in the distribution system, as seen at 64 and 65. The levels at TV sets fed from this tap are 4.5 dbmv. for channel 13 and 1.0 dbmv. for channel 2. Note that throughout the 1050-foot spacing of distribution amplifiers, the levels at the TV sets fed from the various taps are well above −10 dbmv. The distance between repeater amplifiers in the system is made such that the difference $\epsilon$ (first tap) between the dbmv. levels of channels 13 and 2 at the TV sets fed from the first tap is about equal to, but opposite in sign from, the difference $\epsilon$ (last tap) between the dbmv. levels of channels 13 and 2 at TV sets fed from the last tap. Results include substantially improved system signal to noise ratio, the enablement of use of amplifiers with reduced gain requirements, and decrease in flat loss with resultant increase in overload levels of amplifiers, without windshield wiper distortion at the TV sets.

In accordance with a further aspect of the invention, the outputs of the main trunk wide band R.F. amplifiers 13 and 14 are in the range 30 to 40 dbmv. at signal frequencies of about 213 mc. and preferably between 33 and 35 dbmv. Also, successsive main trunk amplifiers are spaced apart at cable distance corresponding to between 15 and 21 db attenuation. Thus, this level is less than the optimum level of the distribution system amplifier outputs, the result being minimized insertion loss in the distribution system, maximum compensation for distortion in the distribution system, and the provision for much longer cascades of amplifiers than previously possible. A recommended standard main trunk system is as follows:

TABLE II

| | |
|---|---|
| Amplifier output level at 213 mc. | +33 dbmv. |
| Amplifier output level at 57 mc. | +23.5 dbmv. |
| Amplifier input level at 5° C. | +15 dbmv. |
| Amplifier spacing at 213 mc. and 5° C. | 18 db. |
| System mode | Full tilt. |
| AGC amplifier spacing at 213 mc. | 72 db. |
| Maximum cascaded system length | 180 amplifiers. |

Figure 4:
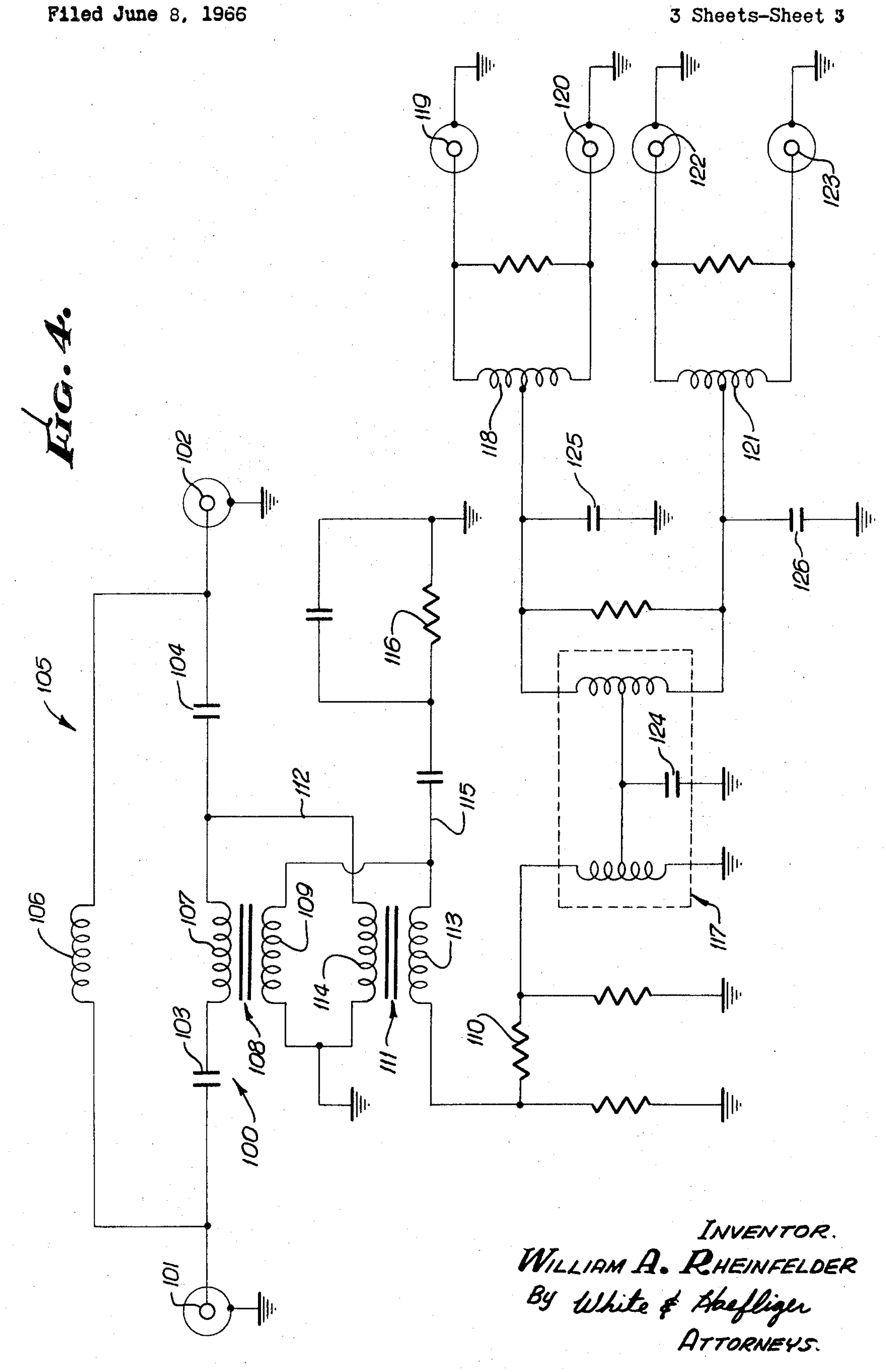
FIG. 4 is a circuit diagram showing a typical directional tap.

The directional tap seen in FIG. 4 includes a path 100 connected between cable input and output points 101 and 102, and incoporating coupling capacitors 103 and 104. A connection 105 bypasses cable transmitted AC power for the amplifiers around the path 100, and includes a choke 106. Path 100 includes the primary 107 of a transformer 108 operable to sense cable transmitted signal current direction, the secondary 109 having an output applied to resistor 110. Another transformer 111 has a primary 114 connected at 112 with path 100 and a secondary 113 whose output is applied to resistor 110, the transformer 111 sensing cable transmitted signal voltage and applying its output in additive relation with the output of transformer 108 to resistor 110. The difference between the transformer outputs appears at 115, and a dummy load 116 absorbs the echo signal.

Tap loss is derived principally at register 110, the output from which is applied to bridge 117 used for impedance matching with respect to the load. From that bridge the signal is applied via center tapped hybrid coil 118 to top outputs 119 and 120, and via center tapped hybrid coil 121 to top outputs 122 and 123, the television receivers being input connected to those output terminals. The network achieves isolation of the outputs, and capacitors 124–126 are used for better frequency response.

Figure 5:
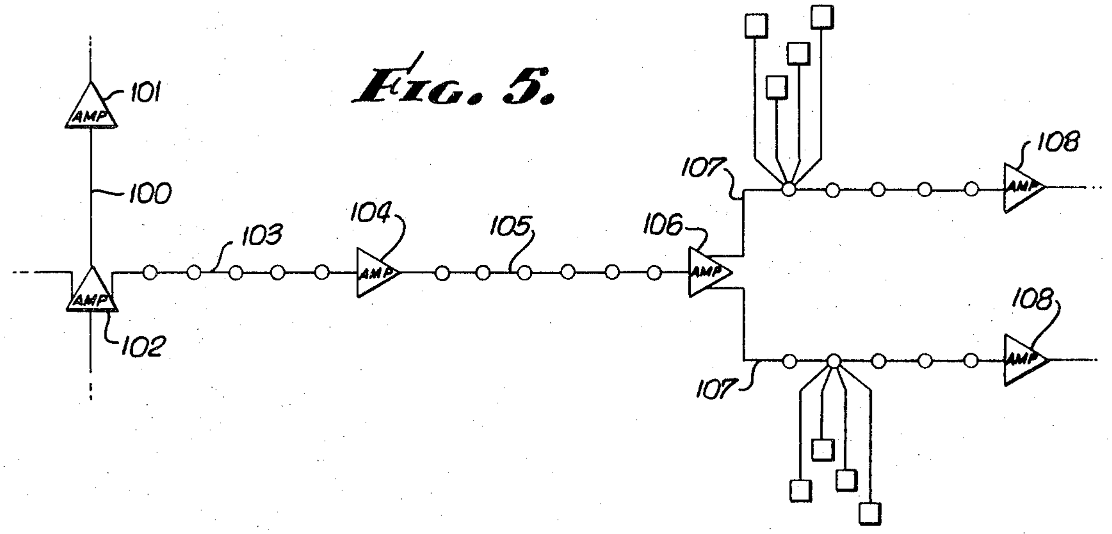
FIG. 5 is a block diagram showing another aspect of the invention.

Finally, FIG. 5 illustrates a portion of a cable television distribution system having a main trunk cable 100 with repeater amplifiers 101, suitable AGC amplifiers, and bridging amplifiers 102, as referred to at 14 in FIG. 1. Distribution cable 103 extends from bridger amplifier 102 to a distribution amplifier 104, and from the latter cable 105 runs to distribution amplifier 106 with built-in splitter, as for example produces two outputs fed along cables 107. Connected in series with the latter are further distribution amplifiers 108.

For lot widths of 75 feet, the length of cable 105 is typically as indicated in Table I, with six taps 109 connected therein and a seventh tap incorporated in the amplifier 104, to make up the seven taps indicated in column 2. Also, the output of amplifiers 104 and 108 is at about 43 dbmv. as indicated in that table.

In accordance with a further aspect of the invention, the lengths of cables 103 and 107 are reduced somewhat due to the extra loss taken in the bridger amplifier output or due to the built-in splitter of the distribution amplifier and the output levels of the preceding amplifiers 102 and 106 are reduced several dbmv. below the outputs of amplifiers 104, resulting in better system balance with reduced overload. Also, many more taps are made available. At the same time, the output levels of amplifiers 106 are kept within the range 37–46 dbmv. at signal frequencies of about 213 megacycles, and are preferably about 40 dbmv. Similarly, the output levels of amplifiers 102 are preferably about 40 dbmv. Recommended standards for amplifiers 106 and cables 107 are as follows:

TABLE III

| | | |
|---|---|---|
| Cable | 0.412" or equivalent | |
| Average loss at 213 mc (at 5° C) | 1.60 db per 100 feet | |
| Average lot width, feet | 50 | 75 |
| Spacing to following distribution amplifier, feet | 800 | 900 |
| Output level, at 213 mc, dbmv | +40 | +40 |
| Output level, at 47 mc, dbmv | +31.5 | +31.5 |
| Input level, at 5° C, dbmv | +22 | +21.5 |
| Number of taps | 8 | 6 |
| Cable loss, db | 12.8 | 14.4 |
| Flat loss, | 5.7 | 5.7 |
| Equalized loss, db | 3.0 | 1.8 |
| Hot loss (+60° C), db | 1.5 | 1.6 |
| Total gain, 213 mc, db | 23.0 | 23.5 |
| Number of houses per amplifier | 57 | 41 |
| Values of directional taps, nominal tap loss, db. | 27, 24, 21, 21, 21, 18, 18, 15 | 27, 24, 21, 18, 18, 15 |
| System mode | (1) | (1) |

[1] Full tilt.

I claim:

1. In a cable television system a distribution cable to transmit multiple channel television signals for reception by subscriber equipment, multiple solid state wide-band R.F. distribution amplifiers connected in series with the cable at predetermined intervals to amplify the transmitted signals and to receive supply voltage from the cable, directional taps connected to tap television signals from the cable between said amplifiers for distribution to the subscriber equipment, the amplifiers compensating for signal attenuation by the cable and insertion loss resulting from operation of the taps, a main trunk cable to transmit said television signals to the distribution cable, main trunk wide-band R.F. amplifers connected in series with the main trunk cable at predetermined intervals to amplify the transmitted signals, the output of individual distribution amplifiers at signal frequencies of about 213 megacycles exceeding the output of individual main trunk amplifiers at signal frequencies of about 213 megacycles, the cable distance between successive distribution amplifiers being such that the difference between channel 2 and 13 signal levels at subscriber equipment fed from the first tap following a distribution amplifier and with a house drop cable length of between 100 and 150 feet is about equal to but opposite in sign from the difference between channel 2 and 13 signal levels at subscriber equipment fed from the last tap following said distribution amplifier prior to the next distribution amplifier and with the same house drop cable length.

2. The system of claim 1, in which the taps are inductive.

3. The system of claim 1, in which successive amplifiers are spaced apart at cable distance corresponding to between 15 and 21 db attenuation.

4. The system of claim 1, wherein the output of each main trunk amplifier is in the range 30 to 40 dbmv. at signal frequencies of about 213 megacycles, and wherein distribution amplifier dmbv. output levels are substantially greater for channel 13 than for channel 2.

5. The system of claim 4, in which successive main trunk amplifiers are spaced apart at main trunk cable distance corresponding to between 15 and 21 db attenuation.

6. In a cable television system, a distribution cable to transmit multiple channel television signals for reception by subscriber equipment, multiple solid state wide-band R.F. distribution amplifiers connected in series with the cable at predetermined intervals to amplify the transmitted signals and to receive supply voltage from the cable, distribution amplifier dmbv. output levels being substantially greater for channel 13 than for channel 2, and directional taps connected to tap television signals from the cable between said amplifiers compensating for signal attenuation by the cable and insertion loss resulting from operation of the taps, a main trunk cable connected to transmit said television signals to the distribution cable, main trunk wide band R.F. amplifiers connected in series with the main trunk cable at predetermined intervals to amplify the transmitted signals, the outputs of main trunk amplifiers at signal frequencies of about 213 megacycles being at lower dbmv. levels than the outputs of distribution amplifiers at said frequencies.

7. The system of claim 6, in which certain of said distribution amplifiers have multiple outputs to feed multiple cables with which said taps are connected, the outputs of said certain distribution amplifiers at signal frequencies of about 213 megacycles being at lower dbmv. levels than the output of single output distribution amplifiers.

8. The system of claim 6, in which the taps are 4-way directional taps spaced apart between 100 and 150 feet along the cable.

References Cited

UNITED STATES PATENTS 2,801,295 7/1957 Sabaroff.
3,054,858 9/1962 Reid ............ 325—308 XR

OTHER REFERENCES

"Maintenance of CATV Systems," by Hallett, Telephone Engineer and Management, vol. 69, No. 22, Nov. 15, 1965.

ROBERT L. GRIFFIN, Primary Examiner

R. S. BELL, Assistant Examiner

U.S. Cl. X.R.

178—6